Nov. 22, 1960 P. F. DONLEY ET AL 2,961,258
SEALING UNIT
Filed Aug. 13, 1956 2 Sheets-Sheet 1

INVENTORS
PHILIP F. DONLEY &
AUGUST H. HEINRICH.
BY Bosworth, Sessions,
Herrstrom & Lawler
ATTORNEYS

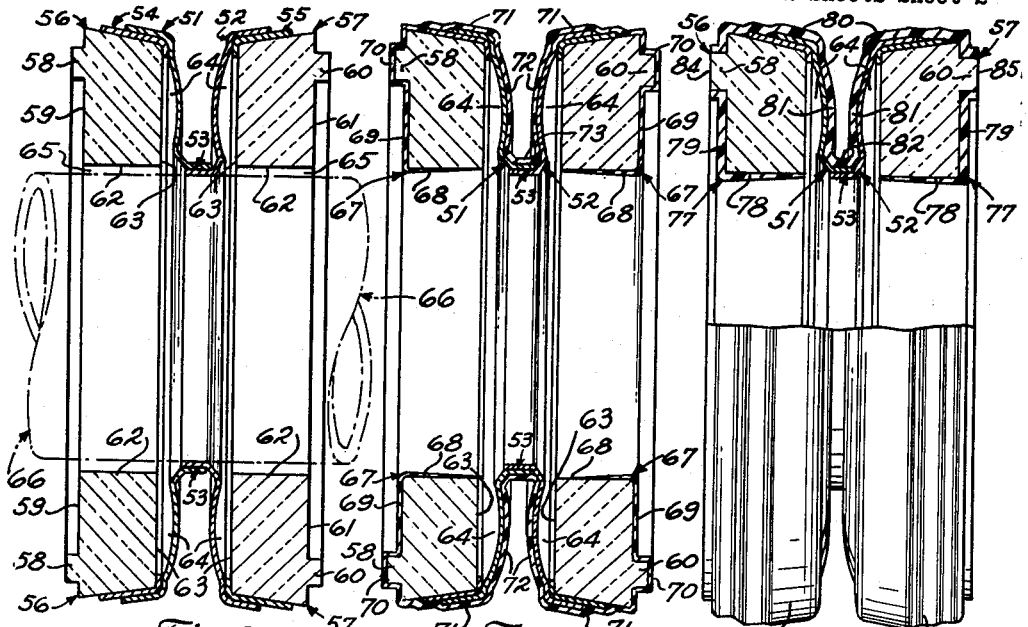

United States Patent Office 2,961,258
Patented Nov. 22, 1960

2,961,258

SEALING UNIT

Philip F. Donley, Shaker Heights, and August H. Heinrich, Cleveland, Ohio, assignors to Donley Products, Inc., Cleveland, Ohio, a corporation of Ohio Filed Aug. 13, 1956, Ser. No. 603,507

1 Claim. (Cl. 286—11.13)

The invention, which is an improvement on those of Heinrich applications Serial No. 358,745, filed June 1, 1953, Serial No. 409,213, filed February 9, 1954, now Patent 2,776,851, and Serial No. 471,341, filed November 26, 1954, relates to a sealing unit for shafts, bearings and the like.

In industry, conventional sealing units of kinds now generally employed have long been among the most vulnerable components of the machines in which they have been used, which include pumps, motors, generators, turbines and a wide variety of machines of other types. Even where there has been no particular temperature and/or pressure differential characterizing the conditions which obtain on opposite sides of the sealing unit, inside and outside, sealing units of the kinds heretofore used have often had very short life expectancies. In part this has been a corollary of the fact that materials of which conventional sealing units have heretofore been made have often tended to stand up poorly, as evidenced by the frequently recurring necessity of replacing sealing rings, diaphragms, gaskets, washers, springs and similar elements, particularly where, as has usually been true of diaphragms, gaskets and washers, they have been made of non-metallic materials.

In part this vulnerability may be attributed to the substance of the element itself, as in the case of elements of rubber, leather, felt and the like. Certain of these substances are deleteriously affected by the presence of oil, which is commonly found in machines of the types in which sealing units are employed. Others age poorly, especially under conditions in which they are subjected to wide changes in temperature, as, for example, where the sealing unit binds temporarily and, in consequence, heats up to an excessively high degree. Quite a number of other substances, including some metals, are abraded or eroded when they come into contact with solid particles, either in the form of contaminants in oils, greases and the like or because of their occurrence or formation under the conditions under which the machine as a whole must be operated. Thus, under conditions that are common to a great many industrial installations, the life of a new sealing unit is often short.

This state of affairs is accentuated where the machine is used for handling a fluid that must be maintained in the meanwhile at a superatmospheric temperature, as, for example, petroleum fractions that are being pumped from one area to another in an oil refinery. Steam, which frequently must be moved from one zone to another for use in prime movers or for processing or heating, creates conditions that are unfavorable to the long-continued operation of sealing units. In the chemical industries, wherein acids, alkalies, detergents, slurries, and media containing organic solvents and the like must often be conducted to or from a given piece of equipment, conditions are even worse, this for the reason that such materials not infrequently tend to attack and corrode the materials used in conventional sealing units.

The three above-mentioned Heinrich applications have had for objects, among others, to provide sealing units which so far as possible are devoid of non-metallic components; which can be made of a very few elements so related to each other that the process of assembly is relatively simple; which in most cases are characterized by ease of replacement of the sealing ring or rings; and which afford a high degree of flexibility in response to unintended endwise movement of a shaft, bearing race or the like. Such sealing units, particularly in their more recently devised forms, have been found to be capable of operating continuously for astonishingly long periods of time under extraordinarily difficult conditions. Among other things, they have afforded liquid-tight seals for continuous periods of weeks and even months in the presence of highly abrasive fluids and rather corrosive chemicals. In some instances, they can be made virtually gas-tight, although this standard is not one that is easy to meet or, if it is met, to maintain.

The present invention has for a further object, over and above such objects as those already mentioned, to provide a sealing unit that for all practical purposes is gas-tight and will remain gas-tight over long periods of time, this notwithstanding extremely unfavorable conditions, such as those encountered in certain branches of the chemical industry. Another object of the invention is to provide a sealing unit that is highly resistant to the attack of acids, alkalis and other corrosive chemicals. Still another object of the invention is to provide processes for making sealing units characterized by these advantages.

To these ends the invention contemplates the use of a protective jacket which envelops the sealing unit at least in large part, if not entirely. Preferably, such jacket consists of a chemically resistant material that is capable of adhering, being adhered, or being caused to adhere to the proximate elements of the sealing unit, such adherence being so nearly complete that there is no likelihood of separation between the jacket and the element or elements on which it is used. Where, as in the hereinafter described embodiments of the invention, the sealing unit itself is flexible in the sense that it is adapted to yield as required in response to endwise movement of a shaft, bearing race or the like, the material of which the protective jacket is formed must be flexible, sufficiently so at least to permit it to flex with the sealing unit itself without cracking, flaking off or, as a result of fatigue, becoming more vulnerable to mechanical or chemical attack. As will appear from the considerations brought out below, the physical characteristics of the jacket, as also the manner of its application to the sealing unit, may vary widely.

Although for the purposes of the present invention sealing units of the kinds shown, described and claimed in the previously mentioned Heinrich applications are preferred, it is entirely possible that a sealing unit that is differently designed, constructed and assembled may be equipped with a protective jacket of one of the kinds to which the present invention relates. The sealing system may, for example, be more elaborate than those represented by the preferred embodiments of the present invention, particularly if it calls for the use of a plurality of sealing units in tandem arrangement. Similarly, the sealing unit may be simpler than those constituting the preferred embodiments of the present invention, as, for example, where a suitably supported sealing ring consisting of little more than an annulus of compressed comminuted carbon is used between two moving parts or a moving part and a stationary part in one and the same machine. What is brought out below concerning the manner of forming and/or applying protective jackets to sealing units of the kinds shown in the accompanying drawings is in many cases applicable to sealing units of simpler or more elaborate construction.

The protective jacket may in some cases be preformed, in which case it must of course conform closely to the shape of the element or elements to which it is to be adhered. In some circumstances, it may be formed in place by the application of tapes, strips or blanks that are capable of adhering or of being made to adhere to the element or elements on which they are used. In other cases, the jacket may be deposited in the form of a liquid, in which case it may consist of a melted material applied by flame spraying or by some similar step or of a synthetic or natural material dispersed in a volatile liquid vehicle such as one of the common organic solvents. In still other cases the jacket may be formed in situ on the sealing unit by the polymerization of an incompletely polymerized synthetic or natural material, the process of polymerization being aided and completed, if desired, by the application of a catalyst or the presence of conditions that are conducive to the further polymerization of the material so laid down on the sealing unit.

The composition of the jacket may vary widely, depending in part on the expected conditions of use of the sealing unit. Although suitably prepared natural materials, such as rubber-asphalt mixtures, are not excluded, synthetic resins are preferred for the purposes of the invention. As such, they may fall into any one of a variety of classes, of which mention may be made of the various cellulosic resins, which are thermoplastic; the polymerizable monomers, dimers, trimers, etc., such as are involved where use is made of the phenol-formaldehyde resins, epoxy resins, vinyl resins, aminoplasts, silicones, urethanes, polyesters and the like; polyamides such as nylon, including nylons derived from caprolactam; neoprene and allied elastomers of synthetic origin; and the substituted and unsubstituted polyethylenes, including polyethylene itself, chlorosulphonated polyethylene, polytrifluorochloro ethylene ("Kel-F"), polytetrafluoro ethylene ("Teflon"), etc. In general, it may be said that these and many similar materials are film-forming in the sense that continuous films can result from their application to the sealing unit either in the form of a single layer or in the form of several superimposed layers, usually the latter.

Depending on the nature of the material or materials of which the protective jacket is formed, the conditions of application of the material to the sealing unit may vary widely. Where the material is to be administered in the form of a lacquer, it may be dissolved in a suitable solvent, applied directly to the sealing unit by brushing, dipping, spraying or the like, and allowed to stand, either at room temperatures or at temperatures somewhat above room temperatures, until the solvent has evaporated. Substantially the same methods may be used with organosols. Analogous methods may be employed where plastisols are used, particularly the vinyl plastisols; if so, a wash primer is sometimes helpful.

Under some circumstances, melts may be used, being applied with the aid of suitable equipment by flame spraying techniques.

Brushing, dipping, and spraying operations may generally be employed where an incompletely polymerized resin is used, although in some cases two or more steps may be required to produce a film. If so, one of them will usually involve an initial step of laying down the film-forming material; a second, the application of something that promotes polymerization, as by means of high-energy irradiation, catalysis or interaction. In a typical case, but not in every case, a primer of some suitable sort can advantageously be applied prior to application of the film-forming material.

Where aqueous dispersions may advantageously be used, as is possible with neoprene systems, rubber systems and systems based on the use of substituted and unsubstituted polyethylenes, brushing, dipping, and spraying represent typical methods of application. Here the use of a primer is sometimes, but not always, helpful in enhancing the adhesion. Baking at temperatures up to several hundred degrees Fahrenheit is usually desirable, such operations being performed in typical cases after the deposition of each of the several layers where two or more layers are deposited on a prime coat or, if no prime coat is applied, on the sealing unit itself. In some instances, as, for example, where nylon can be used, flame spraying may be preferred: it is particularly valuable where substituted polyethylenes are available for use.

Precautions must be taken, before, during, or after application of the protective jacket, to make sure that the sealing surface is left in condition to perform its sealing function when the sealing unit is installed in the apparatus of which it is to form part. As will hereinafter appear, this may sometimes be done by masking or blocking off the sealing surface when the protective jacket is being formed. In other circumstances, it may be preferred to apply the protective jacket to all or substantially all of the sealing unit, including the sealing surface or sealing surfaces, and to rely on subsequent steps for its removal from the surfaces used for sealing. Other methods of protecting the sealing surfaces during or exposing them after application of the resinous material are also possible.

By the use of materials and techniques of the nature of those referred to above, sealing units for use under difficult environmental conditions may be provided with protective jackets which cover all or nearly all of the non-sealing surfaces. Ordinarily, after the protective jacket has had an opportunity to attain its final condition, by which reference is had to its set, resilience, abrasion resistance, etc., the sealing surfaces will be finished or refinished by grinding, by lapping or by a combination of both so as to give the necessary flatness in the zone wherein the sealing action is required in the particular machine of which the sealing unit is to form part. The successful employment of the foregoing and similar materials and techniques to the end of providing sealing units that can stand up for long periods of time under extraordinarily difficult environmental conditions is one of the accomplishments of the present invention.

Other objects, advantages and features of the invention will be apparent from the description which follows and from the accompanying drawings, in which:

Figure 6 is a central section through the sealing unit of Figures 1 and 2 as it appears when mounted on a mandrel preparatory to the application of a series of coats by a spraying process;

Figure 7 is a similar view showing the sealing unit as it appears after the application of the first such coat;

Figure 8 is a similar view, half in section and half in elevation, showing the sealing unit as it appears following the application of several such coats;

Figure 9 is a central section showing the sealing unit with its ends masked preparatory to coating;

Figure 10 is a similar view showing the same sealing unit after a plurality of coatings have been applied to it by dipping, spraying or brushing; and Figure 11 is a similar view, half in section and half in elevation, showing the same sealing unit after the masks have been removed.

In many of these figures, the angles, clearances and thicknesses are shown in greatly exaggerated fashion in the interests of clarity of representation.

Figures 3, 4, 5:
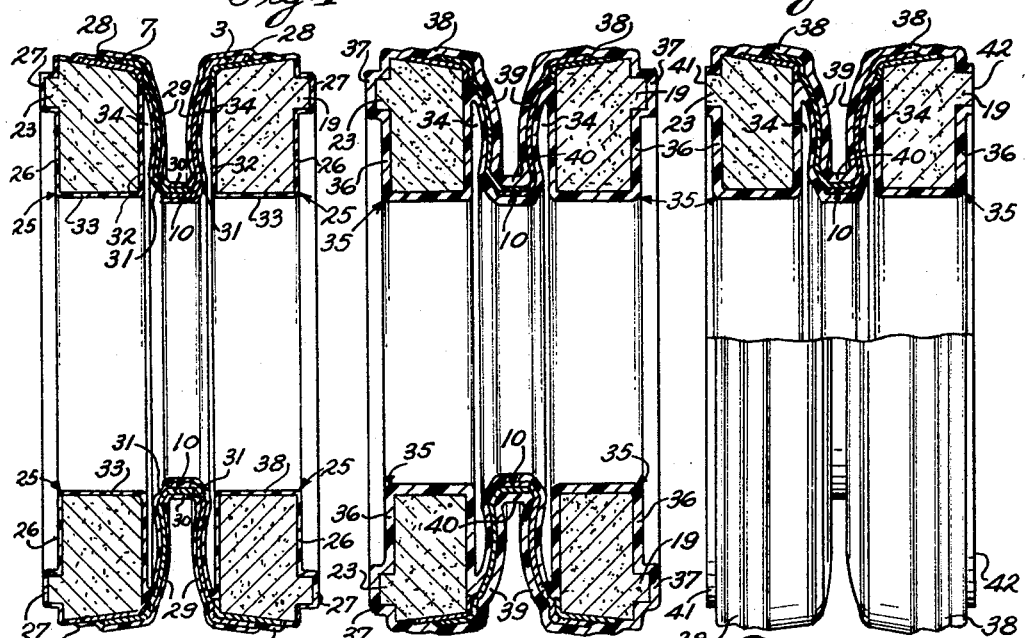
Figure 3 is a central section through the sealing unit as it appears following application of the first of a series of coats (one of which may be a prime coat) applied by a dipping process.
Figure 4 is a similar view showing the same sealing unit as it appears after the application of a plurality of coats.
Figure 5 is a corresponding view, half in section and half in elevation, after finishing the sealing faces of the sealing rings.

Figures 1 to 5, which deal with a first embodiment of the invention, show both the manner of assembling a typical sealing unit of a kind covered by the before-mentioned Heinrich applications and the manner of forming the protective jacket on the assembled sealing unit. Such protective jacket is assumed for the sake of simplicity to be formed by means of a dipping process calling for two or more separate applications of the film-forming material, which may be a lacquer, an organosol, a plastisol, a melt, a water dispersion or any other suitable liquid medium containing the desired film-forming substance of substances. The film layer laid down in each of the several dipping steps is preferably given time to harden before the next following layer is applied. The final film, shown in Figure 4, is a relatively heavy film the thickness of which comes from repeatedly dipping the sealing unit in the preferred film-forming medium.

Figures 1, 2:
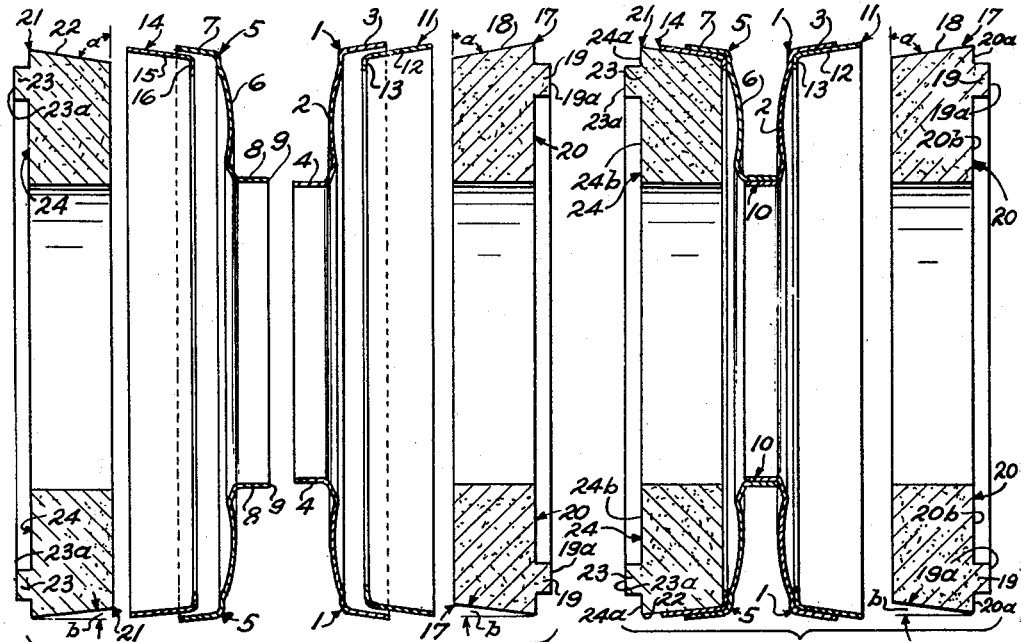
Figure 1 is an exploded view showing in central section the parts that make up a typical sealing unit of a kind within the purview of the invention.
Figure 2 is a similar view showing most of the parts in assembled relation.

Referring first to Figures 1 and 2, the sealing unit will be seen to consist of two sealing rings, two mounting rings, and two annular leaf springs. The latter are preferably of a conventional spring metal such as spring steel, spring brass, stainless steel or the like. Of the two springs, the one designated 1 is characterized by a bowed portion 2 of rather short radius of curvature and, on the opposite sides of bowed portion 2, by an outwardly directed outer flange 3 and by an inwardly directed inner flange 4. The former is flared outwardly and thus is frusto-conical in shape; the latter is substantially cylindrical. Spring 5 is similarly characterized by a bowed portion 6, an outwardly directed outer flange 7 of frusto-conical shape, and an inwardly directed inner flange 8 that is substantially cylindrical.

Preferably, the inner diameter of inner flange 8 of spring 5 is very slightly greater than the outer diameter of inner flange 4 of spring 1. This permits the two inner flanges to be telescoped together and attached to each other, by soldering, brazing, welding or otherwise, in a manner such as to provide a metallic bond between them (not shown). It will be noted from Figure 2 that when the two flanges are telescoped together, the transverse edge 9 on inner flange 8 of spring 5 abuts spring 1. It is with the parts in this relationship to each other that the step of soldering, brazing or welding is performed. If this step is performed in continuous fashion, the result will be to provide a water-tight and gas-tight joint 10 (Figure 2).

A mounting ring 11 flared in the same manner and to the same extent as outer flange 3 of spring 1 is then brought into juxtaposition to the spring in the manner illustrated in Figure 1. Mounting ring 11 consists of a frusto-conical side wall 12 and a short transverse flange 13 adapted to engage the concave side of the spring outwardly of bowed portion 2. After mounting ring 11 is firmly seated in spring 1 in the position illustrated in Figure 2, it is fastened in place by soldering, brazing or welding. A similar mounting ring 14 characterized by a frusto-conical side wall 15 and a short transverse flange 16 is then brought into juxtaposition to spring 5. It is fastened in place on the concave side of the spring outwardly of bowed portion 6. The two mounting rings will usually be of metal, preferably of the same metal of which springs 1 and 5 are themselves composed.

Mounting ring 11 is adapted to receive a sealing ring 17 which, in a typical case, may be of compressed comminuted carbon. It is characterized by an accurately finished holding face 18 that is so tapered as to enable it to seat snugly in sealing ring 11. A flange-like collar 19 provided with a smoothly finished end surface 19a that is to constitute the sealing surface of sealing ring 17 when the latter is installed in the sealing unit projects axially from the general plane of sealing face 20, which extends transversely of the central axis of the sealing ring. Sealing face 20 may be considered as having two other parts, an outer annular portion 20a and the inner annular portion 20b. On the opposite side of the sealing ring from sealing face 20 is a flat back face which requires no particularly high degree of finish. The cylindrical face adapted to encompass the shaft likewise requires no particularly high degree of finish.

Preferably, the angle of taper of the parts is such that flange 3 of spring 1, frusto-conical side wall 12 of mounting ring 11 and holding face 18 of sealing ring 17 make an angle $a$ which measures more than 82½° and less than 90°. The complementary angle $b$ measures something less than 7½° as a maximum and something more than 0° as a minimum, preferably about 5°. In such circumstances, the inter-engaging parts adhere so tenaciously to each other that it is difficult or impossible to separate them without the exercise of a great deal of force. This is for reasons explained in Heinrich applications Serial Nos. 409,213 and 471,341.

Sealing ring 21, shown at the left in Figure 1, is similarly formed and finished. It includes an accurately finished holding face 22 that defines an angle $a$ measuring between 82½° and 90°, thus providing the desired tenacious adherance to the frusto-conical side wall 15 of mounting ring 14. As in the case of sealing ring 17, a flange-like collar 23 projects axially from sealing face 24 between annular portions 24a and 24b thereof. The end surface 23a of collar 23, which forms the sealing surface of sealing ring 21, should be smoothly finished. No particularly high degree of accuracy is required for either the flat back face of the sealing ring or for the cylindrical face that is to encompass the shaft.

Figure 2 indicates how mounting rings 11 and 14 appear when fastened respectively to outer flanges 3 and 7 of springs 1 and 5. Figure 2 also shows the position assumed in the assembly by sealing ring 21. To attain this position, it is urged by hand into contact with mounting ring 14. Sealing ring 17 is shown as standing removed from mounting ring 11. As in the case of mounting ring 21, it is urged by hand into contact with mounting ring 11. The previously mentioned tenacious adherence of these parts comes about when the contiguous surfaces of the sealing and mounting rings are brought into engagement with each other and pressed together with the exercise of a very moderate force. With sealing rings 17 and 21 in place, the sealing unit is ready for the various coating operations.

In Figures 3 to 5, it is assumed that the protective jacket is formed by repeatedly dipping the sealing unit a number of times. This is desirable in order to build up a protective jacket of sufficient thickness. The result of the first dipping step is shown in Figure 3, in which a continuous film 25 covers all exposed surfaces of the sealing unit. It will be noted that sealing faces 20 and 24 are coated as at 26, that sealing surfaces 19a and 23a are coated as at 27, that the stepped outer peripheries of the sealing unit are coated as at 28, and that springs 1 and 5 are coated as at 29, 30 and 31. The same film covers also the back and cylindrical faces of the sealing ring, as respectively indicated at 32 and 33. The film 25 so formed is of substantially uniform thickness throughout, in a typical case not more than a few mils. Open chambers remain at 34 between springs 1 and 5 and sealing rings 17 and 21, respectively.

In some circumstances, film 25 may be the film laid down by the application of a wash primer: such primers are frequently used where vinyl lacquers, organosols or plastisols are employed for coating purposes. The compositions of wash primers are well known and may be ascertained from the literature, if desired. In other cases, film 25 may constitute a preliminary layer of the same composition as the layers subsequently to be laid down upon it, this being particularly true where one of the cellulosic lacquers is being used for coating purposes. In any case, the subsequent coat or coats are not laid down until the liquid vehicle, whether it be water or an organic solvent, has been removed by evaporation from the layer first laid down. Superatmospheric temperatures are preferably employed to evaporate the vehicle. In a proper case, they may also be used to fuse the film to eliminate pin-holes and other imperfections that make for porosity. In the latter case, the sealing unit may have to be exposed to temperatures of some hundreds of degrees Fahrenheit before the next layer is laid down on it.

Figure 4 illustrates the sealing unit after the application of one or more additional coats. By this time, a heavy protective jacket 35 has been formed on all exposed surfaces. The sealing rings are coated across their sealing faces and over their sealing surfaces, as indicated at 36 and 37, respectively, and also over their cylindrical and back faces. The stepped peripheral portions of the sealing unit are coated as indicated at 38. The coating extends over the bowed portions of the two springs as at 39 and covers joint 10 as at 40. It also covers the inside surfaces of the springs; i.e., their concave faces. Chambers 34 remain open as before, this being important if the springs are to flex freely under stress.

The number of coats depends on the nature of the composition and the thickness of the protective jacket which it is desired to form. If a lacquer is used for the purpose, up to ten coats may be necessary, each subsequent coat being superimposed on the preceding coat. If a vinyl plastisol is used, three or four coats (not including the usual priming coat) may be used. Where an aqueous dispersion is used, which may be with or without a prior priming coat, four to six coats are usually required, the application of each being followed by the step of baking at a temperature in the range between 500° and 750° F. in order to eliminate porosity in the protective jacket. When completed, the latter will usually have a thickness of from five to twenty mils, although in some circumstances it may be less than five or more than twenty.

The completely coated sealing unit show n in Figure 4 is not yet in readiness for use for the reason that the sealing surfaces on collars 19 and 23 have been coated over. In order to ready the sealing unit for use, it is necessary to refinish these surfaces. This may be done by scraping, shaving or grinding to remove the protective coating in the areas indicated at 37 in Figure 4. When this portion of the protective coating has been removed, the exposed sealing surfaces of collars 19 and 23 are lapped to provide the highly finished sealing surfaces 41 and 42, respectively. The sealing unit is then ready for use.

Figures 6 to 8 illustrate a process in which the protective jacket for the sealing unit is formed by a brushing, spraying or flow-coating operation. The sealing unit shown in Figure 6 consists of two annular metal leaf springs 51 and 52 that are telescoped together to form the joint 53, of two metal mounting rings 54 and 55, and of two ceramic sealing rings 56 and 57, all of which elements are generally similar to the corresponding elements in Figures 1 to 5. Sealing ring 56 is characterized by a flange-like collar 58 that extends axially from sealing face 59; sealing ring 57, by a flange-like collar 60 that extends axially from sealing face 61. The two sealing rings have their cylindrical faces 62 in alignment with each other. Their back faces 63 are spaced from springs 51 and 52 to form the shallow annular chambers 64. Clearances 65 develop between cylindrical faces 62 and mandrel 66 (indicated in dotted lines) if, as will usually be the case, the sealing unit is temporarily mounted on a mandrel to facilitate the operation of coating it.

As before, the protective jacket may be derived from a lacquer, an organosol, a plastisol, a melt, a dispersion or any other suitable coating composition lending itself to application by spraying, brushing or flow coating. In many cases, a prime coat will be desirable; however, there are circumstances in which the use of a prime coat is not necessary, as where the coating composition takes the form of a cellulosic lacquer. A series of coatings (including the prime coat if one is used) is applied to the sealing unit while it is mounted on the mandrel, each such coat being given time to dry, harden or set up before the application of the next following coat. Where the procedure calls for heating to eliminate pin-holes, as in building up a heavy coating, the sealing unit can be heated to fusion temperatures without removing it from the mandrel. If fusion is not necessary and nothing more is required than the evaporation of an organic solvent, the heating step may be similarly accomplished, although a relatively low temperature is usually indicated in such case.

The first coat to be applied, designated 67 in Figure 7, extends as indicated at 68 over the cylindrical faces of the sealing unit. In the usual case, it tends to feather out as shown, this because of the fact that the clearances 65 are so small as to prevent the formation of a coat of uniform thickness in this area. The coat continues over the sealing faces as indicated at 69, over the sealing surfaces as indicated at 70, and over the stepped peripheral portions of the sealing unit as indicated at 71. It continues as indicated at 72 where the bowed portions of the springs approach each other and in the zone of minimum diameter it overlies joint 53 as indicated at 73. In such circumstances, there is, of course, no coating on back faces 63 and none on the concave sides of springs 51 and 52. Thus annular chambers 64 are left intact.

After other coats have been applied as already described to form a protective jacket of the desired thickness and those portions of the jacket which overlie collars 58 and 60 have been removed, the sealing unit presents the appearance shown in Figure 8. Here a relatively thick coat 77 covers the sealing unit. Portions of it cover the cylindrical faces of the sealing rings as indicated at 78. Other portions of it cover the sealing faces as indicated at 79. The stepped peripheral portions of the sealing unit are coated as indicated at 80. The two springs and the joint between them are coated as indicated at 81 and 82, respectively. Chambers 64 remain open, assuring maximum flexibility of the springs. After the two sealing surfaces have been freed in some convenient way of the resinous material deposited on them, they are machine- or hand-finished, as by a lapping step, to develop the required accurately finished surfaces 84 and 85.

It is evident that the process described with particular reference to Figures 6 to 8 can be employed also if two or more such sealing units are mounted on the same mandrel in touching contact with each other. In such case, those sealing rings that are located at the opposite ends of the series will present exactly the same appearance, when finished, as the two sealing rings 56 and 57 in Figure 8. On those sealing rings that intervene beyond them on the mandrel, there will, of course, be no coatings on the cylindrical faces of the sealing rings to correspond to the feathered coatings 68 and 78 in Figures 7 and 8. In this sense, those sealing units that were located at the extreme ends of the mandrel will be unsymmetrically coated.

Still another process that may be used involves the step of preliminarily masking the sealing surfaces of the sealing rings. This process is illustrated in Figures 9, 10 and 11. Referring first to Figure 9, annular metal leaf springs 91 and 92 carry metal mounting rings 93 and 94, which in turn carry Phosphor bronze sealing rings 95 and 96. Sealing ring 95 is provided with an axially extending collar 97; sealing ring 96, with an axially extending collar 98. These collars project as shown from the two sealing faces 99, each of which faces may be considered as divided into two annular portions; viz., an outer annular portion 99a and an inner annular portion 99b. When it is desired to coat the sealing unit, circular metal masks 100 are applied to the end faces of collars 97 and 98. Such masks protect not only what are later to become the sealing surfaces of the two collars but also the inner annular portions 99b of the two sealing faces 99. Also protected are the cylindrical faces of the two sealing rings, which faces will adjoin the shaft on which the sealing unit will be mounted.

In such circumstances, the coating composition may be any convenient composition that may be applied by dipping, spraying, brushing, flow coating or the like. The first coat to be applied may or may not be a prime coat. In either case, it should tend to form a film 101 that will extend beyond masks 100 onto the exposed surfaces of the sealing unit. Thus it will cover the stepped peripheral portions of the sealing unit, as indicated at 102, the two springs, as indicated at 103, and the joint between them, as indicated at 104. The cylindrical faces, back faces and inner annular portions of the sealing faces of the respective sealing rings will, of course, be protected by the masks from the coating composition, thus remaining intact. If masks 100 are of metal, the sealing unit as a whole, while still in the condition represented in Figure 10, may be exposed to elevated temperatures for the purpose of eliminating solvents, removing pin-holes, etc.

When the necessary thickness has been developed by applying successive layers of the coating composition to the sealing unit, masks 100 will be removed. There is obtained a sealing unit coated to the extent indicated in Figure 11, in which a relatively thick coat is to be found in the areas designated 102, 103 and 104. It is at this stage that the sealing surfaces 105 and 106 on collars 97 and 98, respectively, are finished. To develop the high degree of accuracy that is required for effective sealing, a lapping operation will usually be necessary. There is obviously no coating on sealing surfaces 105 and 106 to require removal before the lapping operation can be undertaken.

The several above-described embodiments of the invention provide sealing units that are coated to different degrees, depending on the procedure employed. The sealing unit shown in Figure 5 is coated throughout except where sealing surfaces 41 and 42 have been uncoated and lapped for the purpose of accurately finishing them. The sealing unit shown in Figure 8 is covered over a very large part of its total exposed area, but not where annular chambers 64 appear between the springs and the sealing rings. The sealing unit shown in Figure 11 has no coating on the cylindrical faces of the sealing rings and none on those portions of the sealing faces 99 that are designated 99b in Figure 9. In all cases, the sealing surfaces; i.e., the outwardly directed faces on the flange-like collars that project axially from the sealing faces, are free of coating. In the sealing units of Figures 5 and 8, the coatings may be considered as interrupted in those zones in which the sealing surfaces are formed.

Within limits determined by the uses to which these sealing units themselves are to be put, the coating compositions that are applied to them may obviously be varied over a very wide range. Where resistance to acids and alkalies is important, it will often be desirable to make use of the polyhalogeno ethylenes, either in the form of polytetrafluoro ethylene or in the form of polytrifluorochloro ethylene. In either case, a dispersion in a suitable liquid vehicle may be used, although at the present time a water dispersion rather than a dispersion in an organic vehicle is preferred. The polyethylenes themselves may be similarly used, although their resistance to acids and alkalies is not so great as that of the polyhalogeno ethylenes. Polypropylenes may also be used, if desired; if so, common methods of application may be utilized.

If it is an unsubstituted polyethylene that is to be employed, it is desirable that the surfaces to be coated be pre-conditioned by pickling, sand blasting, or applying an inorganic phosphate coating ("Bonderite"). A thin prime coat of the desired composition may then be applied in the form of a dispersion of solid particles in finely divided form in a suitable vehicle, with or without a wetting agent or thickener, after which heavier coats may be superimposed on it. If the system is based on the use of one of the halogen-substituted polyethylenes, the solid material may be similarly dispersed in a volatile carrier liquid containing a wetting agent or a thickener; however, it may be applied directly to the surface to be coated, which must be completely clean. It may, if desired, be pre-conditioned by the application of an inorganic phosphate coating.

If it is polytrifluorochloro ethylene that is employed, it is possible to use the non-aqueous dispersions that are available as "Kel-F N-1" and "Kel-F NW-25." If the resin is a polytetrafluoro ethylene ("Teflon"), the vehicle will usually be either an organic non-solvent or water. Following the application of a thin prime coat of the same composition, from two to seven coats of 0.5 to 0.75 mil each may be applied to build up a protective jacket measuring up to 5 mils in thickness. The application of each such coat should be followed by fusion at temperatures between about 600° and 750° F.

Also useful are the neoprenes, synthetic rubbers, natural rubbers and reclaimed rubbers, sometimes in admixture with asphalt or the like.

Nylon is another possibility, as are also the aminoplasts, silicone resins, polyester resins, polyepoxy resins, polyurethane resins, and certain of the more flexible phenolaldehyde reaction products. In many cases, the resin may be applied as a monomer, as a dimer or in some other incompletely polymerized form and allowed to polymerize in situ. In some cases, particularly those in which catalysts can be employed, room temperatures will be quite sufficient, especially if the reaction is given time to run to completion; in others, the application of heat will be desirable. Where the application of heat is indicated, the temperature can often be allowed to go up to 500° F. and above.

In connection with nylon, mention has been made of the fact that nylon may be applied, if desired, by flame spraying techniques. Like the substituted and unsubstituted polyethylenes, it may also be applied in the form of an aqueous or non-aqueous dispersion followed by fusion at temperatures upwards of 500° F. It may be applied in multiple coats up to a total thickness of 10 mils or more. The ability of a nylon coating to withstand high temperatures makes it particularly desirable as a material for use in building up the protective jacket. It is especially useful where superheated steam is being handled.

Plastisols, particularly the vinyl plastisols, may advantageously be used, preferably after the application of a suitable wash primer to the metal.

Lacquers that may be employed can be formulated from the various vinyl monomers, the several grades of nitrocellulose, cellulose acetate, cellulose acetate butyrate, the various cellulose ethers, and sundry other cellulosic resins. It is by no means necessary that the lacquer be a vinyl or cellulosic lacquer, for other film-forming materials such chlorosulphonated polyethylene may be used instead. In all of these cases, the vehicle will ordinarily be one of the active organic solvents such as acetone, methyl ethyl ketone, methyl isopropyl ketone or the like, sometimes admixed with diluents and extenders such as toluene, xylene, petroleum fractions, etc.

One vinyl lacquer system that may be employed involves utilization as a first coat of a wash primer of the type that contains phosphoric acid, polyvinyl butyral, an inhibitive pigment, an alcohol and water. Coverage must be complete, but the thickness of the prime coat should not be more than 0.1 or 0.2 mil. This coat should be followed by a top coat of a clear or pigmented vinyl resin in a suitable solvent mixture, an example being "Vinylite VAGH" (Carbide and Carbon Chemicals Corporation). The latter is understood to contain 85% vinyl chloride, 10% vinyl acetate, and 5% vinyl alcohol. This coating composition may be applied in multiple coats numbering up to 10 to 15 to give a total thickness of 10 to 15 mils. The coating can advantageously be up-graded by baking it for 15 to 20 minutes at a temperature of 320° to 400° F.

Another vinyl lacquer system that may be employed to good advantage makes use of a wash primer applied as described above followed by a thin coat, 1 mil or less, of a solution of "Vinylite VAGH," followed in turn by a plurality of coats of a conventional vinyl organosol or plastisol, usually from 2 to 4. If an organosol is employed, the thickness of the individual coats may vary between 1 mil and 10 mils; if a plastisol is used, the thickness of each coat may be 5 or 6 mils. At minimum, enough coats should be used to build up a protective jacket having a total thickness of 5 to 10 mils, followed by baking from 2 to 15 minutes at temperatures of 375° to 400° F.

From what has already been said, it will be apparent that, as regards the materal of which the protective jacket is formed, there is much freedom of choice, depending largely on the conditions of intended use of the sealing unit. So far as concerns the manner of application, it will be apparent from what is shown and described that dipping, spraying, brushing, flow coating, flame spraying and various other techniques may be employed. The extent to which the protective jacket envelops the sealing unit may range from substantially complete coverage as in the case illustrated in Figure 5, to coverage of approximately half of the accessible area, as in the case illustrated in Figure 11. In each case, the sealing surface must be exposed before use; for example, at the site of intended use. In the latter situation, the protective jacket will help safeguard the sealing unit against damage in storage, shipment, etc.

It is intended that the patent shall cover, by summarization in the appended claim, all features of patentable novelty residing in the invention.

What is claimed is:

A self-contained sealing unit for shafts and the like comprising two similar sealing rings; two similar metal mounting elements by which the sealing rings are supported; two similar metal spring members by which the mounting elements are supported; two similar metal flanges on the spring members by which the spring members are supported from each other; and a protective jacket covering all of those portions of the above-mentioned components that would otherwise be exposed when the sealing unit is in use, said protective jacket extending into contiguity with the sealing surfaces of the sealing rings along at least one edge of each of said surfaces.

References Cited in the file of this patent

UNITED STATES PATENTS

| | | |
|---|---|---|
| 1,850,683 | Merrill | Mar. 22, 1932 |
| 1,851,032 | Bischof | Mar. 29, 1932 |
| 1,963,936 | Clark | June 19, 1934 |
| 2,089,570 | Petrelli | Aug. 10, 1937 |
| 2,140,518 | Doolittle | Dec. 20, 1938 |
| 2,392,998 | Pross | Jan. 15, 1946 |
| 2,455,114 | Cobb | Nov. 30, 1948 |
| 2,597,976 | Cousins | May 27, 1952 |
| 2,712,459 | Wahl | July 5, 1955 |
| 2,753,198 | Ayling | July 3, 1956 |
| 2,758,856 | Payne et al. | Aug. 14, 1956 |
| 2,776,851 | Heinrich | Jan. 8, 1957 |
| 2,788,306 | Cox et al. | Apr. 9, 1957 |

FOREIGN PATENTS

| | | |
|---|---|---|
| 705,132 | Great Britain | Mar. 10, 1954 |